United States Patent
Park et al.

(10) Patent No.: US 9,253,792 B2
(45) Date of Patent: Feb. 2, 2016

(54) METHOD AND APPARATUS OF FRAME SCHEDULING IN WIRELESS LOCAL AREA NETWORK SYSTEM

(71) Applicant: Electronics and Telecommunications Research Institute, Daejeon (KR)

(72) Inventors: Jae Woo Park, Daejeon (KR); Deuk Su Lyu, Daejeon (KR); Sok Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 156 days.

(21) Appl. No.: 13/917,567

(22) Filed: Jun. 13, 2013

(65) Prior Publication Data

US 2013/0336250 A1    Dec. 19, 2013

(30) Foreign Application Priority Data

Jun. 13, 2012 (KR) .................. 10-2012-0063319

(51) Int. Cl.
    *H04L 12/28* (2006.01)
    *H04W 72/12* (2009.01)
    *H04W 84/12* (2009.01)
    *H04W 74/08* (2009.01)

(52) U.S. Cl.
    CPC .......... *H04W 72/12* (2013.01); *H04W 74/0816* (2013.01); *H04W 84/12* (2013.01)

(58) Field of Classification Search
    CPC ..... H04L 47/10; H04L 12/5693; H04L 47/22; H04L 47/527; H04L 49/254; H04L 47/2433; H04L 47/2441
    USPC ............ 370/412, 229, 230, 230.1, 237, 395.4
    See application file for complete search history.

(56) References Cited

U.S. PATENT DOCUMENTS

| | | | |
|---|---|---|---|
| 6,574,220 B1* | 6/2003 | Petty | 370/395.4 |
| 2002/0071387 A1* | 6/2002 | Horiguchi et al. | 370/229 |
| 2002/0136230 A1* | 9/2002 | Dell et al. | 370/416 |
| 2003/0063562 A1* | 4/2003 | Sarkinen et al. | 370/230 |
| 2006/0062189 A1* | 3/2006 | Takeuchi | 370/338 |
| 2009/0271680 A1* | 10/2009 | Tanigawa et al. | 714/748 |
| 2010/0061235 A1* | 3/2010 | Pai et al. | 370/230.1 |
| 2012/0020369 A1* | 1/2012 | Sundararaman et al. | 370/412 |
| 2013/0051237 A1* | 2/2013 | Ong | 370/237 |

* cited by examiner

*Primary Examiner* — Wei Zhao
*Assistant Examiner* — Sai Aung (57) ABSTRACT

A frame scheduling method performed by a wireless local area network (WLAN) terminal that transmits a frame in a WLAN system is provided. The method includes enqueuing a transmission target frame to a first stage queue corresponding to the transmission target frame among a plurality of first stage queues generated by recipient addresses and traffic identifiers (TIDs) of reception stations, dequeuing, by a first stage scheduler, a first frame from a queue selected from among the plurality of first stage queues and transmitting the same to one of a plurality of second stage queues, and transmitting, by a second stage scheduler, a second frame of a queue selected from among the plurality of second stage queues.

16 Claims, 5 Drawing Sheets

METHOD AND APPARATUS OF FRAME SCHEDULING IN WIRELESS LOCAL AREA NETWORK SYSTEM

CROSS-REFERENCE TO RELATED APPLICATIONS

This application claims the benefit of priority of Korean Patent Application No. 10-2012-0063319 filed on Jun. 13, 2012, which is incorporated by reference in their entirety herein.

BACKGROUND OF THE INVENTION

1. Field of the Invention

The present invention relates to wireless communications, and more particularly, to a scheduling method and an apparatus supporting the same in a wireless local area network (WLAN) system.

2. Related Art

Recently, diverse wireless communication technologies are under development in line with the advancement of information communication technology. Among them, a wireless local area network (WLAN) is a technique allowing mobile terminals such as personal digital assistants (PDAs), lap top computers, portable multimedia players (PMPs), and the like, to wirelessly access the Internet at homes, in offices, or in a particular service providing area, based on a radio frequency technology.

Since IEEE (Institute of Electrical and Electronics Engineers) 802, a standardization organization of a WLAN technique, was established in February 1980, a great deal of standardization works have been conducted.

The early WLAN technique supported the rate of 1~2 Mbps through frequency hopping, spread spectrum, infrared communications, and the like, by using a 2.4 GHz frequency based on IEEE 802.11, and recently, a maximum rate of 54 Mbps can be supported by employing orthogonal frequency division multiplex (OFDM) technology to the WLAN. Further, IEEE 802.11 are putting standards of various techniques, such as improvement of quality of service (QoS), allowing for compatibility of access point (AP) protocols, achievement of security enhancement, measurement radio resource measurement, wireless access vehicular environment, ensuring fast roaming, establishing a mesh network, interworking with an external network, wireless network management, and the like, into practical use or are still developing them.

A basic access mechanism of an IEEE 802.11 MAC (Medium Access Mechanism) is a CSMA/CA (Carrier Sense Multiple Access with Collision Avoidance) combined with binary exponential backoff. The CSMA/CA mechanism is also called a DCF (Distributed Coordination Function) of IEEE 802.11 MAC, basically employing a 'listen before talk' access mechanism. In this type of access mechanism, a station (STA) first listens to a radio channel or a medium before starting a transmission. Upon listening, when it is detected that the medium is not in use, the listening station starts its transmission. Meanwhile, when it is detected that the medium is in use, the station enters a delay period determined by a binary exponential backoff algorithm, rather than starting its transmission.

A station which has accessed a channel through the foregoing channel access procedure may obtain authority to use a wireless medium and transmit its frame. Here, when a plurality of frames to be transmitted are buffered in the station, a transmission method including transmission order of frames is required to be considered. A scheduling method that may be able to schedule a transmission schedule of frames and effectively transmit frames in an opportunity for using a limited wireless medium is required.

SUMMARY OF THE INVENTION

The present invention provides a two stage scheduling method capable of solving a performance degradation problem due to a difference between a time at which information is scheduled in a higher layer and a time at which a channel is actually accessed.

The present invention also provides a wireless device operable in a wireless local area network (WLAN) system supporting a two stage scheduling method.

In an aspect, a frame scheduling method performed by a wireless local area network (WLAN) terminal that transmits a frame in a WLAN system is provided. The method includes enqueuing a transmission target frame to a first stage queue corresponding to the transmission target frame among a plurality of first stage queues generated by recipient addresses and traffic identifiers (TIDs) of reception stations, dequeuing, by a first stage scheduler, a first frame from a queue selected from among the plurality of first stage queues and transmitting the same to one of a plurality of second stage queues, and transmitting, by a second stage scheduler, a second frame of a queue selected from among the plurality of second stage queues.

The plurality of second stage queues may be configured as two or more queues by access categories (ACs).

The first frame may be selected based on a channel state by the first scheduler.

Each of the plurality of second queues may include a plurality of virtual queues.

The first frame may include timing information regarding a timing added to any one of the plurality of virtual queues.

The second frame may be selected based on the timing information.

In another aspect, a wireless terminal performing frame scheduling to transmit a frame in a wireless local area network (WLAN) system is provided. The terminal includes a processor. The processor is configured to enqueue a transmission target frame to a first stage queue corresponding to the transmission target frame among a plurality of first stage queues generated by recipient addresses and traffic identifiers (TIDs) of reception stations, dequeue, by a first stage scheduler, a first frame from a queue selected from among the plurality of first stage queues and transmitting the same to one of a plurality of second stage queues, and transmit, by a second stage scheduler, a second frame of a queue selected from among the plurality of second stage queues.

According to embodiments of the present invention, a performance degradation problem arising due to a time difference between a scheduling timing in an upper layer and a timing for accessing an actual channel. Frame transmission scheduling performed in a higher layer may be adjusted by reflecting a situation at an actual transmission timing. Scheduling information may be altered by reflecting a channel condition, an access category (AC) of a frame to be transmitted, and user priority.

DESCRIPTION OF EXEMPLARY EMBODIMENTS

Hereinafter, embodiments of the present invention will be described in detail with reference to the accompanying drawings. In describing the present invention, if a detailed explanation for a related known function or construction is considered to unnecessarily divert the gist of the present invention, such explanation will be omitted but would be understood by those skilled in the art.

When a component is mentioned as being "connected" to or "accessing" another component, this may mean that it is directly connected to or accessing the other component, but it is to be understood that another component may exist therebetween. On the other hand, when a component is mentioned as being "directly connected" to or "directly accessing" another component, it is to be understood that there are no other components in-between.

While terms such as "first" and "second," etc., may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component.

Also, elements of the embodiments of the present invention are independently illustrated to show different characteristic functions, and it does not mean that each element is configured as separated hardware or a single software component. Namely, for the sake of explanation, respective elements are arranged to be included, and at least two of the respective elements may be incorporated into a single element or a single element may be divided into a plurality of elements to perform a function, and the integrated embodiment and divided embodiment of the respective elements are included in the scope of the present invention unless it diverts from the essence of the present invention.

Also, some of the elements may be optional to merely enhance the performance, rather than being essential to perform a constitutional function. The present invention may be implemented by using only the elements requisite for implement the essence of the present invention, excluding elements used to merely enhance the performance, and a structure including only the essential elements excluding the optional elements merely used to enhance the performance is also included in the scope of the present invention.

Figure 1:
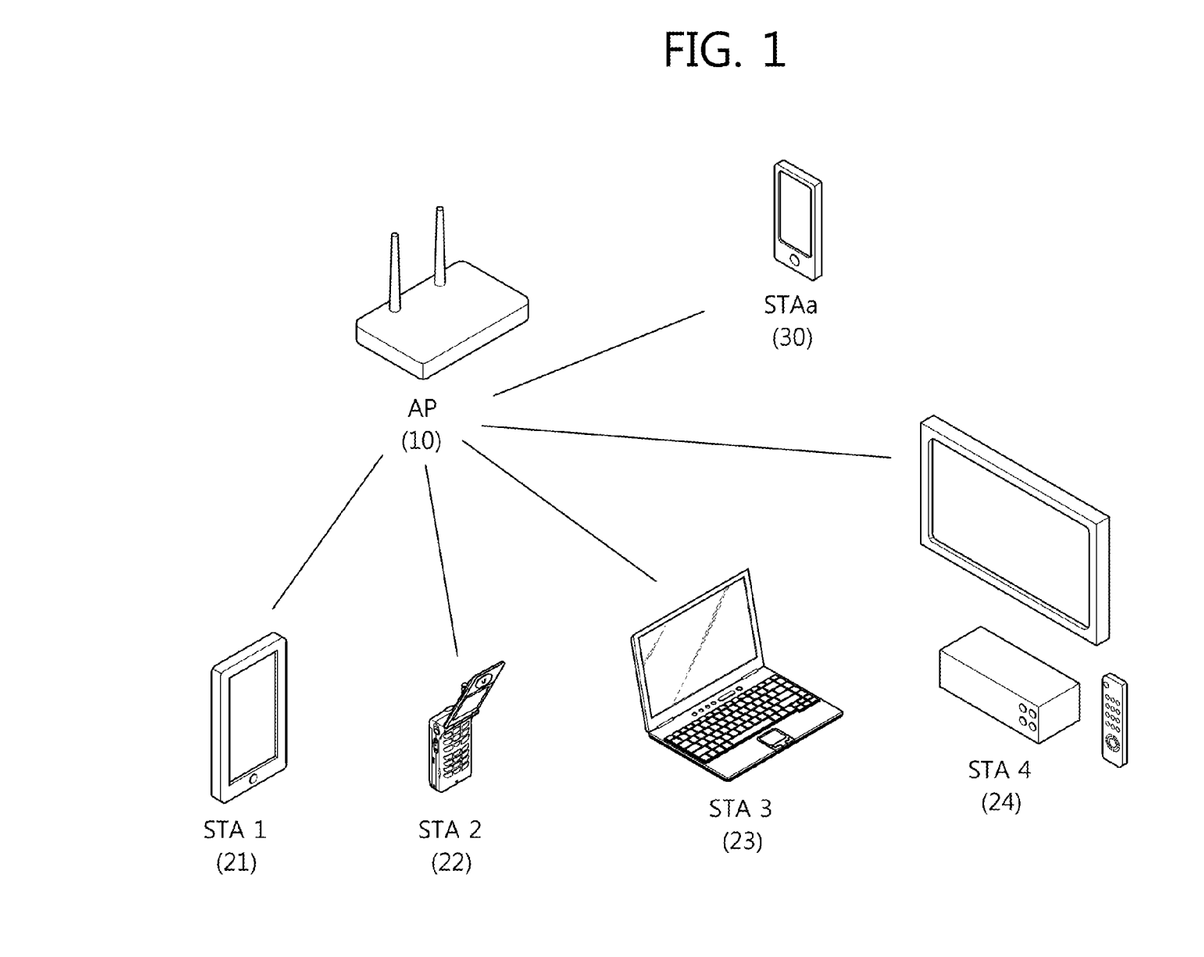
FIG. 1 is a view illustrating a configuration of a wireless local area network (WLAN) system to which an embodiment of the present invention is applicable.

FIG. 1 is a view illustrating a configuration of a wireless local area network (WLAN) system to which an embodiment of the present invention is applicable.

With reference to FIG. 1, a WLAN system includes one or more of basic service sets (BSSs). A BSS refers to a set of stations (STAs) that can communicate with each other in synchronization, rather than a concept indicating a particular area.

An infrastructure BSS includes one or more non-AP stations (non-AP STA1, non-AP STA2, non-AP STA3, non-AP STA4, non-AP STA5), an access point (AP) providing a distribution service (DS), and a distribution system connecting the plurality of APs. In the infrastructure BSS, the AP manages the non-AP STAs of the BSS.

Meanwhile, the IBSS is a BSS operating in an ad-hoc mode. The IBSS does not include an AP, so it cannot be a centralized management entity performing a management function at the center. Namely, in the IBSS, non-AP STAs are managed in a distributed manner. In the IBSS, every STA may be configured as a mobile station, and the IBSS establishes a self-contained network, not allowing an access to a distribution system (DS).

A station is a certain function medium including a medium access control (MAC) and a physical layer interface with respect to a wireless medium which follow the stipulation of IEEE 802.11 standard. A station includes both AP and non-AP stations in a broad sense.

A non-AP STA is an STA which is not an AP. The non-AP STA may be referred to by other names such as mobile terminal, wireless device, wireless transmit/receive unit (WTRU), user equipment (UE), mobile station (MS), mobile subscriber unit, simply, user, or the like. Hereinafter, a non-AP STA will be designated by STA.

The AP is a functional entity for providing an access to the DS by way of a wireless medium for an STA (Associated Station) associated thereto. In the infrastructure BSS including the AP, in principle, communications between non-STAs are made by way of the AP, but when a direct link has been established, the STAs can directly communicate with each other. The AP may be also called by other names such as centralized controller, base station (BS), node-B, base transceiver system (BTS), site controller, and the like.

A plurality of infrastructure BSSs including the BSS illustrated in FIG. 1 may be connected via the DS. The plurality of BSSs connected via the DS is called an extended service set (ESS). The AP and/or STAs included in the ESS may communicate with each other, and a non-AP STA may move from one BSS to another BSS within the same ESS while seamlessly performing communication.

In the WLAN system according to IEEE 802.11, a basic access mechanism of MAC (Medium Access Mechanism) is a CSMA/CA (Carrier Sense Multiple Access with Collision Avoidance). The CSMA/CA mechanism is also called a DCF (Distributed Coordination Function) of IEEE 802.11 MAC, basically employing a 'listen before talk' access mechanism. In this type of access mechanism, an AP and/or station (STA) senses to a radio channel or a medium before starting a transmission. As a result of sensing, when it is determined that the medium is in an idle status, the AP and/or station STA starts a packet transmission through the corresponding medium. Meanwhile, when it is detected that the medium is in an occupied state, the corresponding AP and/or STA does not start its transmission but sets a delay period for media access and waits.

The CSMA/CA mechanism includes virtual carrier sensing as well as physical carrier sensing in which the station (STA) directly senses a medium. The virtual carrier sensing is to complement a problem that may arise in media access, such as a hidden node problem, or the like. For the virtual carrier sensing, the MAC of the WLAN system uses an NAV (Network Allocation Vector). The NAV is a value for the AP and/or STA, which currently uses the medium or has authority to use the medium, to indicate a time remaining for the medium to be available, to a different AP and/or STA. Thus, the value set as the NAV corresponds to a period during which the medium is due to be used by the AP and/or STA which transmits a corresponding packet.

Along with a DCF, an IEEE 802.11 MAC provides an HCF (Hybrid Coordination Function) based on a PCF (Point Coordination Function) which periodically polls to allow every reception AP and/or STA to receive a data packet in a synchronous access scheme based on polling along with the DCF. The HCF has EDCA (Enhanced Distributed Channel Access) based on contention and an HCCA (HCF Controlled Channel Access) using a channel access scheme based on contention-free using a polling mechanism as an access scheme in which a provider provides data packets to a plurality of users. The HCF includes a medium access mechanism for enhancing QoS (Quality of Service) of the WLAN, and QoS data may be transmitted in both of a contention period (CP) and a contention-free period (CFP).

Figure 2:
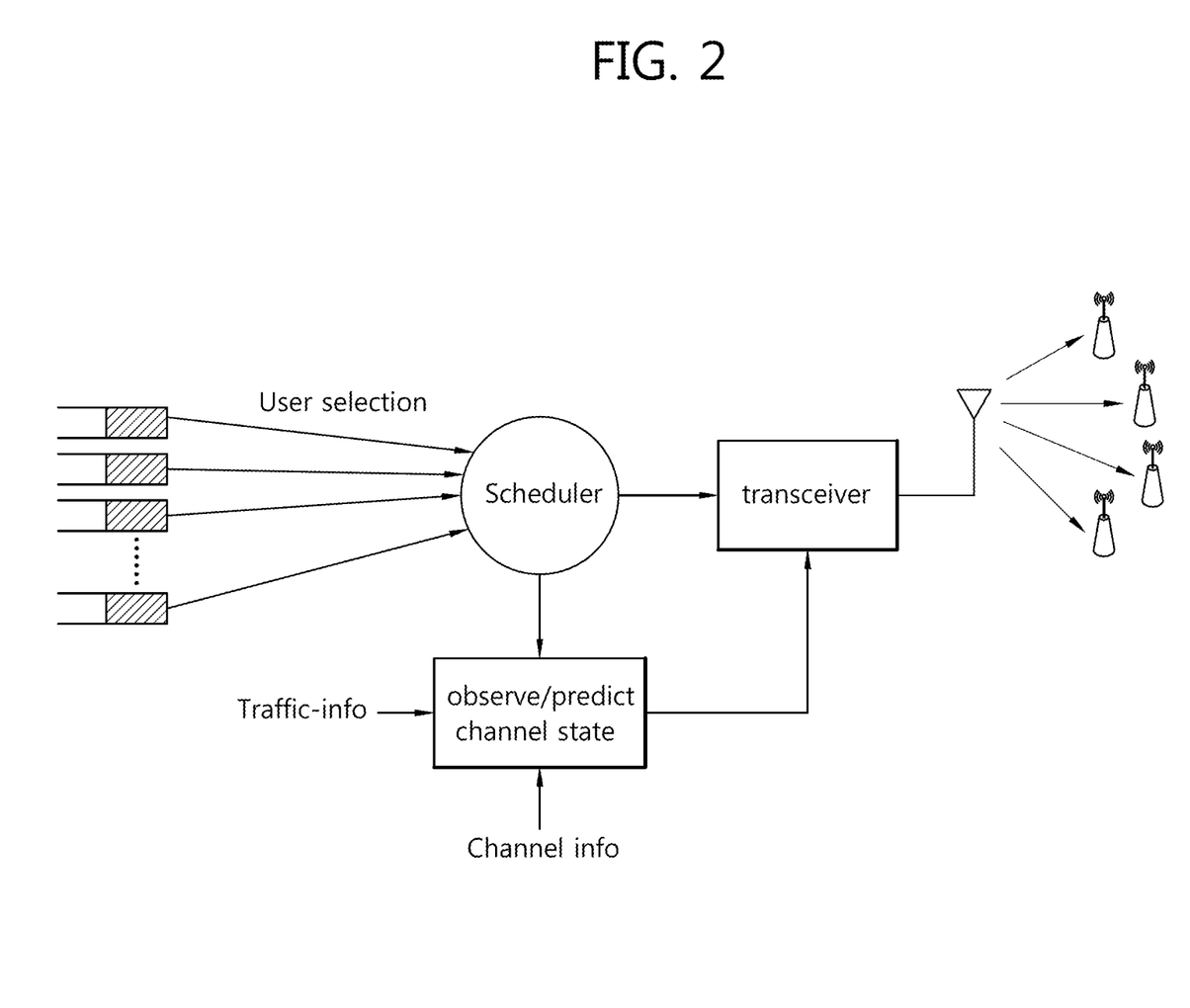
FIG. 2 is a view illustrating an example of a scheduling method for a frame transmission in the wireless communication system.

FIG. 2 is a view illustrating an example of a scheduling method for a frame transmission in the wireless communication system.

A scheduler selects a queue to be transmitted from a plurality of queues and transmit data of the corresponding queue. Here, the plurality of queues may be queues according to types of data buffered in a single terminal or queues of data buffered in a plurality of terminals and to be transmitted. In determining to what degree of data from which queue is to be transmitted, the scheduler may consider channel information and traffic information. In transmitting data, beamforming transmission may be performed by forming and transmitting a beam by applying a precoding matrix, as necessary.

A cellular system in which, without channels separated for each user, several users share a radio channel and a data service is provided, has a scheduling algorithm for determining to what degree of data is to be transmitted, to whom data is to be transmitted, or at which point at present or in the future data is to be transmitted. In general, an algorithm for checking a state of channels received by users and selectively transmitting a user having the best channel condition in a current channel state is called an opportunistic scheduler or a greedy scheduler. A channel state, priority, fairness, and the like, may be used as input factors for determining the scheduling algorithm. As another example of a scheduling scheme, a scheme of allocating an equal time to each user by using a round robin algorithm may be used.

In the cellular-based wireless communication system, the base station centrally controls allocation of channels to users and resources, so the centralized scheduling method illustrated in FIG. 2 may be possible. In the WLAN system, an access point (AP) may serve as a base station as a scheduler in the cellular-based wireless communication system. An AP may perform scheduling to allow a particular station (STA) to access a channel and transmit a frame within a limited range by using a channel access protocol such as a point coordination function (PCF) or an HCCA (a hybrid coordination function (HCF) controlled channel access). However, the PCF or HCCA protocol is inferior to a DCF (distributed coordination function) or an EDCA (enhanced distributed channel access) in terms of implementation complexity or stability, so it is are not frequently used.

Unlike the cellular system, the WLAN uses a CSMA/CA (carrier sense multiple access with collision Avoidance), and may use a DCF or an EDCA protocol as a mechanism for an AP or each STA to independently access a channel.

Based on the DCF or the EDCA, every terminal including an AP or an STA equally access a channel through a CSMA/CA. The CSMA/CA protocol uses a random backoff method, having non-deterministic characteristics as to when a STA will be allocated a channel. Due to this characteristics, when a channel is quickly changed, it is difficult to obtain a scheduling gain.

The WLAN system may be divided into a lower layer portion including the DCF or the EDCA that may be largely implemented by hardware and a higher layer that has a function of enqueuing a frame to a queue by access categories (ACs) and performs a management function. The higher layer may also be implemented by software.

Figure 3:
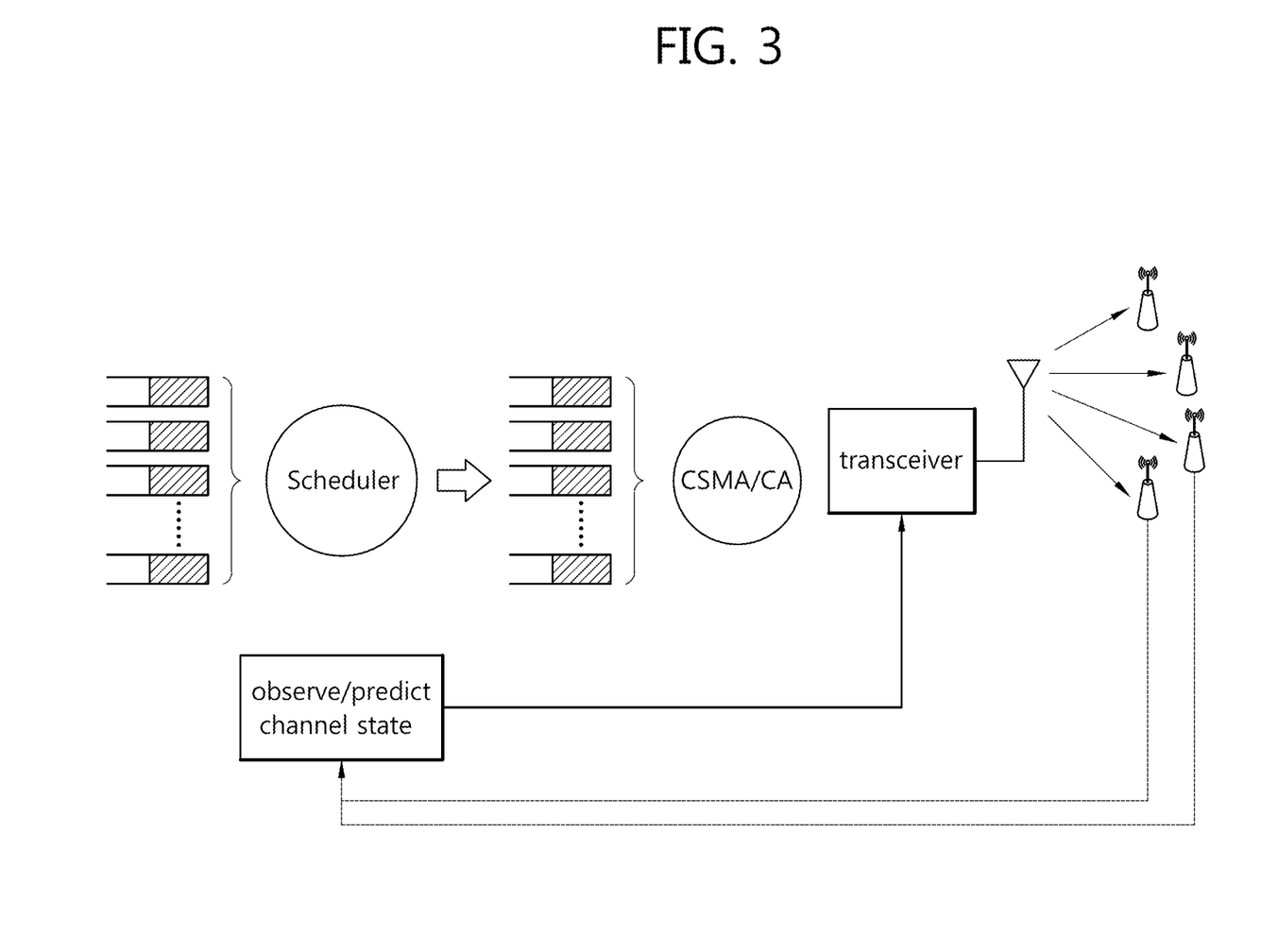
FIG. 3 illustrates an example of a frame scheduling method applicable to a WLAN system.

FIG. 3 illustrates an example of a frame scheduling method applicable to a WLAN system.

In a WLAN system, there may be two stage queue. An upper layer may perform first stage queuing to set a queue in consideration of an STA and a TID parameter, and dequeue a frame from a first stage queue generated through the first stage queuing in consideration of a size that can be aggregated into a single transmission frame, a channel state, and the like, and transmit the same to a queue by ACs.

In a second stage queue, a queue by ACs is selected by the EDCA protocol in input order, and a frame present in a header of the queue may be transmitted.

As shown in the example of FIG. 3, when scheduling is applied in the WLAN system, in general, scheduling is implemented in a higher layer in consideration of complexity of the system. The higher layer may receive traffic information including channel information and user priority information from each STA and enqueue data corresponding to an appropriate STA to queue by ACs.

The queue by ACs may be randomly selected by the DCF or EDCA. Data may be transited to a wireless medium according to a method of FCFS (First Come, First Served) in which frame which first arrived from a queue is first transmitted.

In this method, although the higher layer determines order of data in consideration of a channel state and inputs it in the second stage queue to inform it, data may not be transmitted in a designated time due to the characteristics of the CSMA/CA protocol.

Thus, there may be a time difference between a timing at which a channel state is determined considered to determine a queue in the higher layer and a timing at which actual data is selected and transmitted through a wireless medium. The difference between a reference timing of the channel state referred to for setting a queue in the high layer and the timing at which data is actually transmitted may cause a degradation of transmission efficiency in a certain portion. This is because information such as a channel state, or the like, referred to for setting a transmission queue may be different from information such as a channel state, or the like, at a timing at which data is actually transmitted. As the time difference between both timings as described above is increased, the possibility that performance degradation appears may also be increased.

In a different method of a frame transmission, data may be extracted midway without using the FCFS scheme, but this method may cause a problem that information regarding order of packets received by a receiver, and the like, may be additionally required.

In the example of FIG. 3, the queue separated in two stages may be conceptually integrated into one, but it may be difficult to be implemented in an actually applied embodiment.

Figure 4:
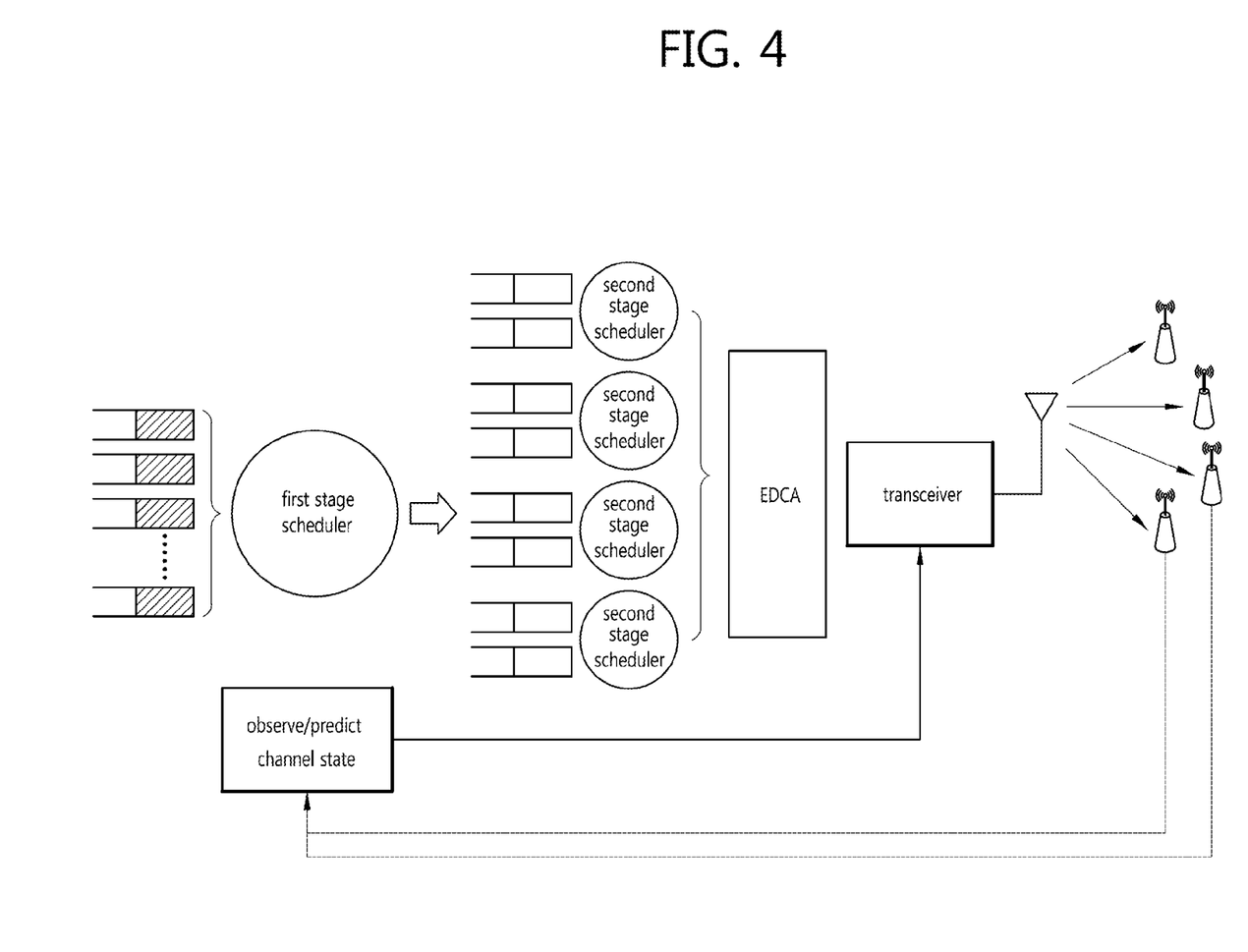
FIG. 4 illustrates a frame scheduling method according to an embodiment of the present invention.

FIG. 4 illustrates a frame scheduling method according to an embodiment of the present invention.

The frame scheduling method according to an embodiment of the present invention may use two stage scheduling. In a first stage queue, each queue may be generated for each RA (Receiver Address) and TID (traffic identifier). The two stage queue may be configured as two or more queues in each AC.

In order to enhance data transmission efficiency in the WLAN system, when frames received from a higher application have the same reception STA and TID, a frame aggregation method of reducing overhead of a channel access by increasing a size of frames may be applied. Namely, when a plurality of frames transferred from the higher layer are frames to be transmitted to the same station and TIDs of the frames are identical, the plurality of frames may be aggregated so as to be transmitted in the form of an A-MSDU.

In the first stage, queues may be manages by STAs and TIDs. A first stage schedule may predict a size of aggregated frames and channel information to select a queue having a good channel state among queues in which the number of frames stored therein exceeds an aggregation size. The channel stage may be obtained by observing/predicting a channel state, and may also be obtained through feedback from reception terminals.

When the channel state is the same, a queue having high priority to which TID is mapped may be selected. Data from the selected first stage queue may be dequeued and sent to the second stage queue.

When the first stage scheduler enqueues the frame from the queue selected in the first stage to two or more queues, the first stage schedule may select a queue in the following manner. In IEEE 802.11e, an AC mapped according to a TID value is designated. Here, when a new frame is mapped to a queue by ACs by a TID, two or more queues may exist in the AC, and a frame to be transmitted may be selected according to the following rule.

A queue to which a frame having the same information previously is selected as a two stage queue. Here, in order to prevent concentration of traffic to one side, a position of the first stage schedule may be changed. The first stage scheduler may check an amount of traffic and select a virtual queue number within an AC from RA and TID by using additional mapping information. An enqueue time at which the scheduler determines channel information after the queue is selected may be recorded as information regarding a frame. Information regarding the frame may be a buffer descriptor, specifically, a TxBD (Transmission Buffer Descriptor). Here, TxBD is transmitted together with a frame and includes information regarding how a frame is to be processed. An enqueue timing may be included in the TxBD and transmitted together with the frame. Here, as the recorded enqueue timing, a timing at which the scheduler determines that a channel is good is recorded.

The first stage scheduler may store at least any one of whether to apply beamforming, aging information of a beamforming matrix, and user priority information together with information indicating an enqueue timing.

Hereinafter, an example of a method for selecting a queue by the second stage scheduler will be described. The two stage scheduler may independently select a virtual queue by ACs. A channel access function of the WLAN system has one exposed queue by ACs. A plurality of virtual queues may be configured in the exposed queue. Information regarding the virtual queues is integratedly managed such that virtual queues belonging to the same AC are viewed as a single exposed queue in view of the EDCA block. Since the EDCA block only need to know whether or not there is a frame in the exposed queue, when even one frame exists in the virtual queue, the two stage scheduler informs the EDCA block that there is a frame in the exposed queue.

The exposed queue by ACs is selected by the EDCA protocol, and the two stage scheduler may select a virtual queue from a plurality of virtual queues corresponding to a selected AC according to the following procedure.

The two stage scheduler may retrieve information of a frame existing in a header of each virtual queue and compare them to select a queue. In case of a transmission to which beamforming is applied, aging information of channel information is checked. Namely, how long before the channel information was updated is checked, and a frame having old channel information may be selected or a frame having the latest information may be selected according to a scheduling policy.

When beamforming is not applied to all the frames present in the header of the virtual queue, a frame having the earliest enqueue timing may be selected or a frame included in the latest queue may be selected.

When an enqueue timing is within a pre-set range according to the scheduling policy, a frame to be transmitted to an STA having highest priority in consideration of priorities of STAs may be selected.

A frame is dequeued from the selected queue according to the foregoing algorithm and transmitted to a wireless medium (WM).

In case of one virtual queue, a frame may be transmitted according to an FCFS policy. In case of two or more virtual queues, a method such as round-robin, or the like, may be used, and an employed policy/scheme may vary according to a scheduling policy.

Figure 5:
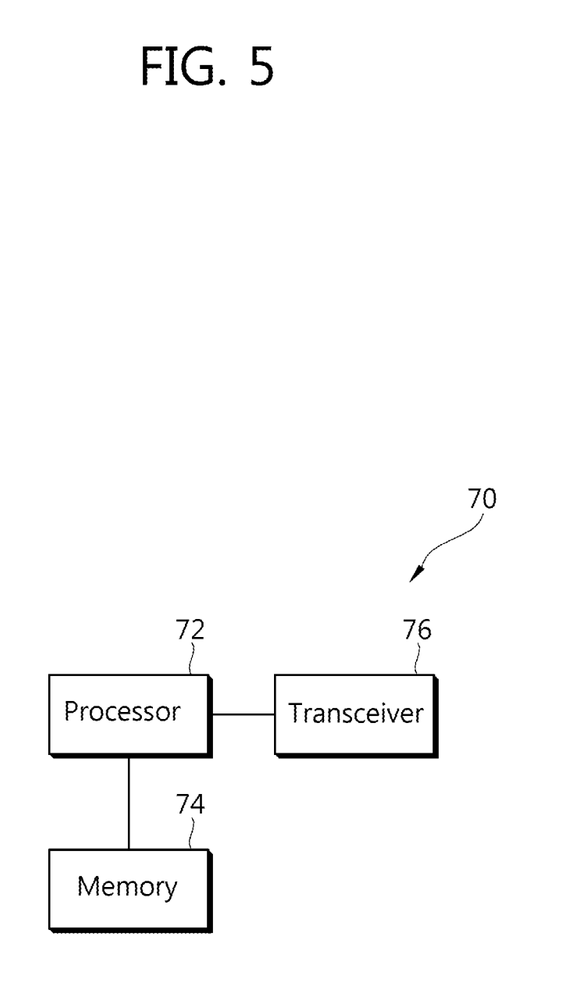
FIG. 5 is a block diagram showing a wireless device to which an embodiment of the present invention is applicable.

FIG. 5 is a block diagram showing a wireless device to which an embodiment of the present invention is applicable. A wireless device 70 is an STA that may implement the foregoing embodiment, which may be an AP or a non-AP station.

The wireless device 70 includes a processor 72, a memory 74, and a transceiver 76. The transceiver 76 transmits/receives a radio signal and implements a physical layer of IEEE 802.11. The processor 72 is functionally connected to the transceiver 76 to implement a MAC layer and a physical layer of IEEE 802.11. The processor 72 may be configured to implement the two stage scheduling scheme proposed by the present invention, thus implementing the foregoing embodiments.

The processor 72 and/or transceiver 76 may include an ASIC (application-specific integrated circuit), a different chip set, or a logical circuit and/or data processing unit. The memory 74 may include a ROM (read-only memory), a RAM (random access memory), a flash memory, a memory card, a storage medium and/or any other storage devices. When an embodiment is implemented by software, the foregoing scheme may be implemented as a module (process, function, etc.) performing the foregoing function. The module may be stored in the memory 74 and executed by the processor. The memory 74 may be present within or outside the processor 72 and may be connected to the processor through various known units.

While the present invention has been shown and described in connection with the embodiments, it will be apparent to those skilled in the art that modifications and variations can be made without departing from the spirit and scope of the invention as defined by the appended claims.

What is claimed is:

1. A frame scheduling method performed by a wireless local area network (WLAN) terminal that transmits a frame in a WLAN system, the method comprising:

enqueuing a transmission target frame to a first stage queue corresponding to the transmission target frame among a plurality of first stage queues, the first stage queues being generated by media access control (MAC) addresses and traffic identifiers (TIDs) of reception stations;

dequeuing, by a first stage scheduler, a first frame from a first queue selected from among the plurality of first stage queues and transmitting the first frame to one of a plurality of second stage queues, the plurality of second stage queues being generated by access categories (ACs); and transmitting, by a second stage scheduler, a second frame from a second queue selected from among the plurality of second stage queues to a wireless medium, wherein the first stage scheduler selects, as the first queue, a queue having a good channel state among first stage queues in which a number of frames stored therein exceed an aggregation size, the aggregation size representing a number of frames to be transmitted in the form of an A-MSDU (Aggregated MAC Service Data Unit) to a same reception station.

2. The method of claim 1, wherein the plurality of second stage queues are configured as two or more queues by access categories (ACs).

3. The method of claim 1, wherein the first frame is selected based on a channel state by the first stage scheduler.

4. The method of claim 1, wherein each of the plurality of second stage queues includes a plurality of virtual queues.

5. The method of claim 4, wherein the first frame includes timing information regarding a timing added to any one of the plurality of virtual queues.

6. The method of claim 5, wherein the second frame is selected based on the timing information.

7. A wireless terminal performing frame scheduling to transmit a frame in a wireless local area network (WLAN) system, the terminal comprising:

a processor, wherein the processor is configured to perform:

enqueuing a transmission target frame to a first stage queue corresponding to the transmission target frame among a plurality of first stage queues generated by MAC addresses and traffic identifiers (TIDs) of reception stations;

dequeuing, by a first stage scheduler, a first frame from a first queue selected from among the plurality of first stage queues and transmitting the first frame to one of a plurality of second stage queues, the plurality of second stage queues being generated by access categories (ACs); and transmitting, by a second stage scheduler, a second frame from a second queue selected from among the plurality of second stage queues to a wireless medium, wherein the first stage scheduler selects, as the first queue, a queue having a good channel state among first stage queues in which a number of frames stored therein exceed an aggregation size, the aggregation size representing a number of frames to be transmitted in the form of an A-MSDU (Aggregated MAC Service Data Unit) to a same reception station.

8. The wireless terminal of claim 7, wherein the plurality of second stage queues are configured as two or more queues by access categories (ACs).

9. The wireless terminal of claim 7, wherein the first frame is selected based on a channel state by the first stage scheduler.

10. The wireless terminal of claim 7, wherein each of the plurality of second stage queues includes a plurality of virtual queues.

11. The wireless terminal of claim 10, wherein the first frame includes timing information regarding a timing added to any one of the plurality of virtual queues.

12. The wireless terminal of claim 11, wherein the second frame is selected based on the timing information.

13. The method of claim 4, wherein information regarding the virtual queues is integratedly managed such that virtual queues belonging to a same AC are viewed as a single exposed queue.

14. The method of claim 4, wherein the second stage scheduler determines one of a plurality of virtual queues corresponding to a selected AC by retrieving information of a frame existing in a header of each virtual queue and comparing the retrieved information with each other, and selects the determined virtual queue as the second queue.

15. The wireless terminal of claim 10, wherein information regarding the virtual queues is integratedly managed such that virtual queues belonging to a same AC are viewed as a single exposed queue.

16. The wireless terminal of claim 10, wherein the second stage scheduler determines one of a plurality of virtual queues corresponding to a selected AC by retrieving information of a frame existing in a header of each virtual queue and comparing the retrieved information with each other, and selects the determined virtual queue as the second queue.

* * * * *